United States Patent [19]

Lansiart et al.

[11] 4,117,330
[45] Sep. 26, 1978

[54] GAMMA RADIATION DETECTOR

[75] Inventors: Alain Lansiart, Gif-sur-Yvette; Jean-Pierre Morucci, Pins-Justaret; Alain Seigneur, Choisel, all of France

[73] Assignee: Commissariat a l'Energie Atomique, Paris, France

[21] Appl. No.: 789,627

[22] Filed: Apr. 21, 1977

[30] Foreign Application Priority Data

Apr. 27, 1976 [FR] France .................. 76 12427

[51] Int. Cl.² .............................................. G01T 1/20
[52] U.S. Cl. .............................................. 250/361 R
[58] Field of Search .................. 250/361, 362; 313/93, 313/101

[56] References Cited

PUBLICATIONS

Palmer, H. E., "Recent Advances in Gas Scintillation Proportional Counters," IEEE Transactions on Nuclear Science, vol. NS-22, Feb. 1975, pp. 100-103.

Primary Examiner—Alfred E. Smith
Assistant Examiner—Janice A. Howell
Attorney, Agent, or Firm—McNenny, Pearne, Gordon, Gail, Dickinson & Schiller

[57] ABSTRACT

A gamma radiation detector, wherein it comprises a xenon crystal, a xenon atmosphere above said xenon crystal, a pair of electrodes comprising two metallic electrodes on either side of the xenon crystal, the first electrode being brought to negative potential (cathode) and located in the vicinity of one face of the xenon crystal and the second electrode brought to positive potential (anode) is placed parallel to the cathode in the xenon atmosphere and visualization device of the photons emitted in the gaseous xenon, whereby the face of the xenon crystal in the vicinity of the cathode is arranged in such a way that it receives the gamma radiation to be measured.

5 Claims, 3 Drawing Figures

GAMMA RADIATION DETECTOR

BACKGROUND OF THE INVENTION

The present invention relates to a gamma radiation detector.

Gamma radiation detectors are particularly used in gamma cameras, which are particularly used for making gamma radiograms of a member containing a gamma radiation emitter, such as a radioactive element (for example $^{131}$I).

However, the hitherto used gamma cameras do not make it possible to obtain very good radiograms and this shortcoming is linked with the poor gamma ray/visible photon transformation ratio within the gamma radiation detector. Attempts have been made to use gamma cameras with image intensifiers, but the latter are difficult and costly to produce.

It is known that two-phase detectors with liquid-gaseous xenon or liquid xenon with a high stopping capacity create electrons which are attracted by an electric field in said gas to give visible or ultraviolet photons. However, the use of xenon in the liquid state is far from easy because it makes necessary the use of the detector in a horizontal position.

BRIEF SUMMARY OF THE INVENTION

The problem of the present invention is to provide a gamma radiation detector of improved definition and efficiency.

The detector according to the invention, which permits the detection of gamma radiation, comprises a solid xenon crystal with a high stopping power surmounted by a gaseous xenon atmosphere. Two electrodes are located on either side of the two-phase detector, said electrodes being raised to different potentials, so that the electrons created in the crystal under the influence of gamma radiation escape from the crystal, are accelerated by the electric field between the electrodes and are directed towards the anode located in the gas. During their passage in the gaseous xenon, these create photons by impact of the electrons on the xenon atoms.

Thus, the two electrodes enclosing the xenon crystal have a double function. Firstly, they extract the electrons from the xenon crystal, said electrons having been created by impact of the gamma photons to be detected and secondly they accelerate these electrons in the gaseous xenon in such a way that they produce photons by inelastic impacts.

Thus, the detector according to the invention with a solid xenon in equilibrium with its vapour is characterised by a good stopping capacity of the gamma rays in the solid xenon associated with a significant amplification of luminous intensity in the gaseous xenon. Due to the amplification of luminous intensity in the gas, the detector is thus able to make visible a gamma absorbed in the solid.

The density of the solid xenon is 3.6 g/cm$^3$. It is very close to that of sodium iodide (3.67 g/cm$^3$) used in the prior art of a scintillator (i.e. a body which directly transforms the gammas into visible photons). Thus, solid xenon and sodium iodide have very similar stopping capacities for the gamma radiation energy used in medicine. The main interest of the solid-gas xenon detector is due to the internal amplification, the electrons resulting from the absorption of a gamma after extraction of the solid phase and accelerated in the gaseous atmosphere cause a luminous avalanche or an amplification of luminous intensity. This amplification of luminous intensity is localised, that is to say it occurs on the passage of the electron between two electrodes, the electron substantially following the lines of the electric field. This permits a good optical definition when the detector is used for reproducing an image formed by gamma radiation in the crystal, which is very important when the detector is used in a gamma camera.

In order to have a stable amplification of luminous intensity, the electronic acceleration in the gas must take place under conditions such that there is no electronic avalanche and instead photons are only created by a luminous avalanche. However, the absence of an electronic avalanche obviates the danger of interelectrode breakdown. To this end and as will be shown hereinafter, it is ensured that the value of the product of the coefficient $\alpha$, first Townsend coefficient by the length of the electron path in the gaseous xenon is below 1.

The electric fields used are of the order of several kV/cm and are created by the potential difference imposed between the two electrodes. The first electrode (cathode) must be transparent to gamma rays and covers one face of the crystal, whilst the second electrode is transparent to photons created in the gaseous atmosphere and preferably has a good structure. An ultraviolet camera can be associated with the detector according to the invention because the electrons which strike the gaseous xenon creates ultra-violet rays. However, this type of camera is expensive and preferably optical systems operating in the visible range are used, in which case it is necessary to convert the ultra-violet photons into visible photons. For this purpose, a layer of an optical frequency converter, such as diphenyl stilbene or salicylate is placed above the second electrode (anode).

BRIEF DESCRIPTION OF THE DRAWINGS

Other and further objects of the present invention will be apparent from the following description and claims and are illustrated in the accompanying drawings, wherein show:

DETAILED DESCRIPTION OF THE PREFERRED EMBODIMENTS

Figure 1:
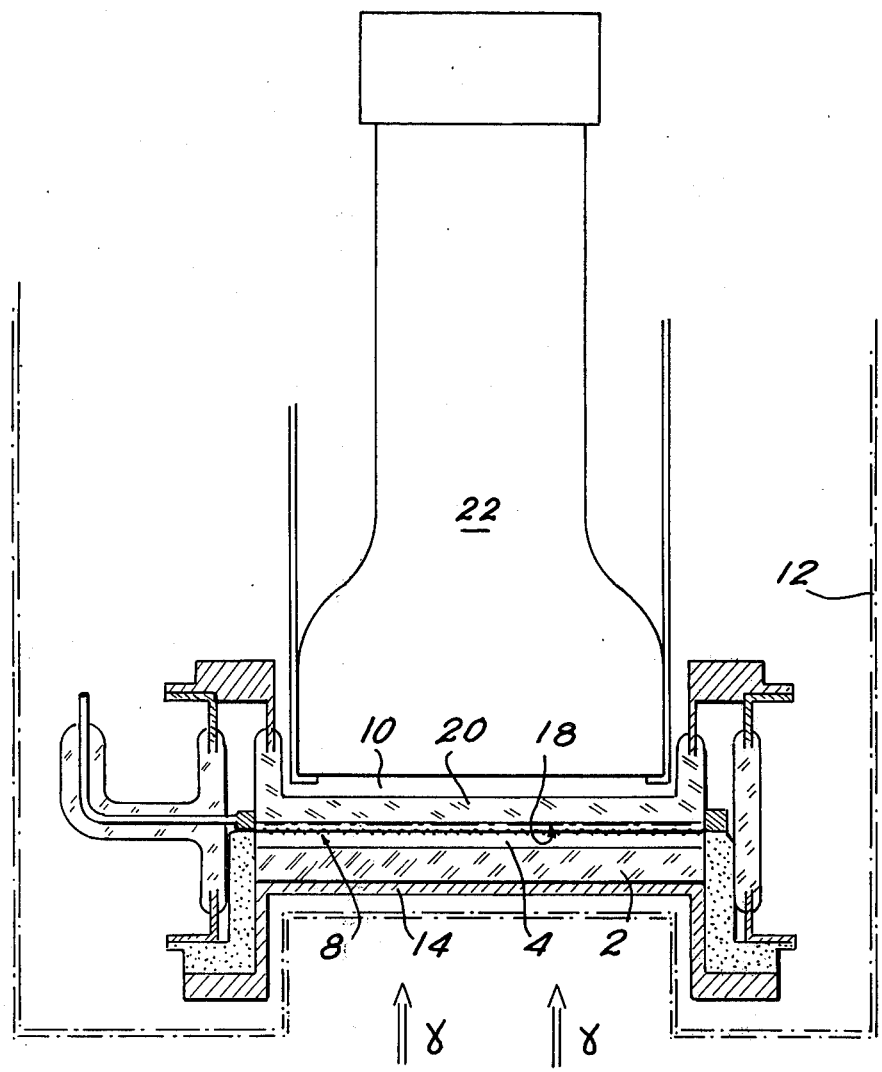
FIG. 1 a diagram of a preferred embodiment of the device according to the invention.

FIG. 1 shows a diagram of the gamma radiation detector according to the invention comprising a solid xenon crystal 2 located in a cryostatic enclosure 12, which is shown in an extremely diagrammatic manner because it is well known to the skilled expert in such a way that within said enclosure there is a constant temperature of approximately 160° K at which the xenon is in the solid state. The xenon is in equilibrium with its vapour phase 4. Cathode 14 serves as a support for the crystal in the cryostatic enclosure 12. Electrode 8 has a grid-like structure and is parallel to cathode 14. Grid 8 is the anode which must be connected to a not shown power supply. In this preferred embodiment of the detector according to the invention, a layer of an optical frequency converter 18 placed on the glass window 20, e.g. diphenyl stilbene, converts the ultra-violet rays created in the gaseous atmosphere 4 above the crystal into visible photons. A photomultiplier 22 measures the light emitted. The spaces 10 between the glass window 20 and the photomultiplier 22 is under a vacuum.

Cathode 14, which is transparent to gamma radiation is for example made from aluminium. The field E between the two electrodes 14 and 8 is a function of the voltage V established by the supply of the dielectric constant $\epsilon_s$ (substantially equal to 2) of the solid xenon, the relative thicknesses of crystal 2 and atmosphere 4 and the distance between electrodes 14 and 8. The solid xenon crystal has a thickness $l_1$ and the gaseous atmosphere a thickness $l_2$ above the solid xenon 2. As V is the potential difference established between electrodes 14 and 8 by the electric power supply, the electric field $E_2$ in the gaseous xenon is given by the formula:

$$E_2 = (\epsilon_s V)/(l_1 + \epsilon_s l_2)$$

In the same way, the electric field $E_1$ in the solid xenon is:

$$E_1 = V/(l_1 + \epsilon_s l_2)$$

As an example, the distances $l_1$ and $l_2$ are respectively chosen to be equal to 0.6 and 0.2cm. The potential imposed between the two electrodes is 3kV, so that the field $E_1$ in the solid xenon is equal to 3kV/cm and the electric field $E_2$ in the gaseous xenon is equal to 6kV/cm. These characteristics which are given in an exemplified manner illustrate the advantages and characteristics of the detector according to the invention compared with the prior art (sodium iodide scintillator).

The electron acceleration potential V in gaseous xenon is 1,200V. As will be shown hereinafter it cannot reach too high values in order to avoid electronic avalanches (low Townsend coefficient $\alpha$). The energy loss of an electron giving an ultra-violet photon by collision with a gaseous xenon atom is 40 eV. Thus, for each electron extracted from the solid xenon, the luminous amplification coefficient over the electron path is 30, i.e. 30 photons are created for each electron extracted by the solid. However, in the solid xenon 17, eV are necessary to create an electron (1 exciton in fact) by irradiation of a gamma photon. Thus, as the amplification is 30 photons per electron, the average energy taken on the gamma photon is:

$$17 \, eV/30 = 0.57 \, eV$$

For comparison, in sodium iodide detectors, 24 eV are required to directly create an ultra-violet photon from a gamma photon, so that the light zone compared with sodium iodide is $24/0.57 = 42$, which is surprisingly large.

To obtain a good optical definition, it is advantageous to prevent electronic multiplication in the gaseous xenon. If $n_0$ is the number of electrons leaving the crystal, the number of electrons n after a distance $l_2$ is equal to:

$$n = n_0 e^{\alpha l_2}$$

To prevent electronic amplification, it is ensured that the product $\alpha l_2$ is low.

Figure 3:
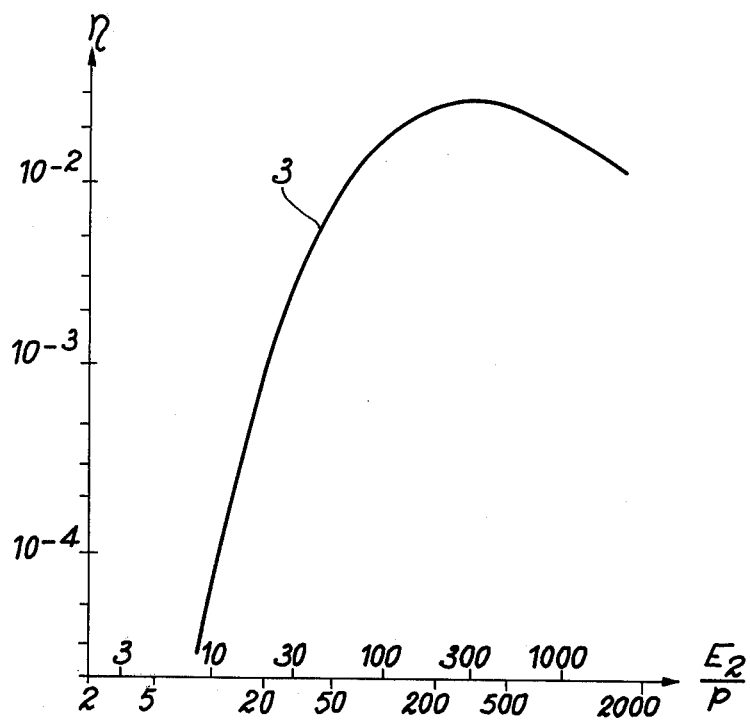
FIG. 3 the curves giving the variations of coefficient equal to the ratio $\alpha/E$ in the gaseous xenon as a function of the electric fields — gaseous pressure quotient.

Curve 3 of FIG. 3 shows the variations of the coefficient $\eta = \alpha/E_2$ relative to the xenon, as a function of the ratio $E_2/p$, p being the gaseous pressure of the xenon.

On the basis of this curve and with the knowledge of pressure p, which is the pressure of the saturated vapour at the solid xenon temperature (560 Torr), it is possible to determine the ratio $n/n_0$.

In the above numerical example, the ratio $E_2/p$ is equal to 10.7 $Vcm^{-1} Torr^{-1}$, corresponding to a value of $\eta = 7.10^{-5}$ and $\alpha = 0.42 cm^{-1}$. Over a distance of 2mm, the product $\alpha l_2 = 0.08$ and the value of the electronic amplification coefficient $n/n_0$ is 1.08.

When the detector according to the invention is inserted in a gamma radiation camera, it is possible to position both upstream and downstream of the camera detector, image intensifiers and optical — electronic coders — decoders, of an appropriate conventional construction without passing beyond the scope of the invention.

Figure 2:
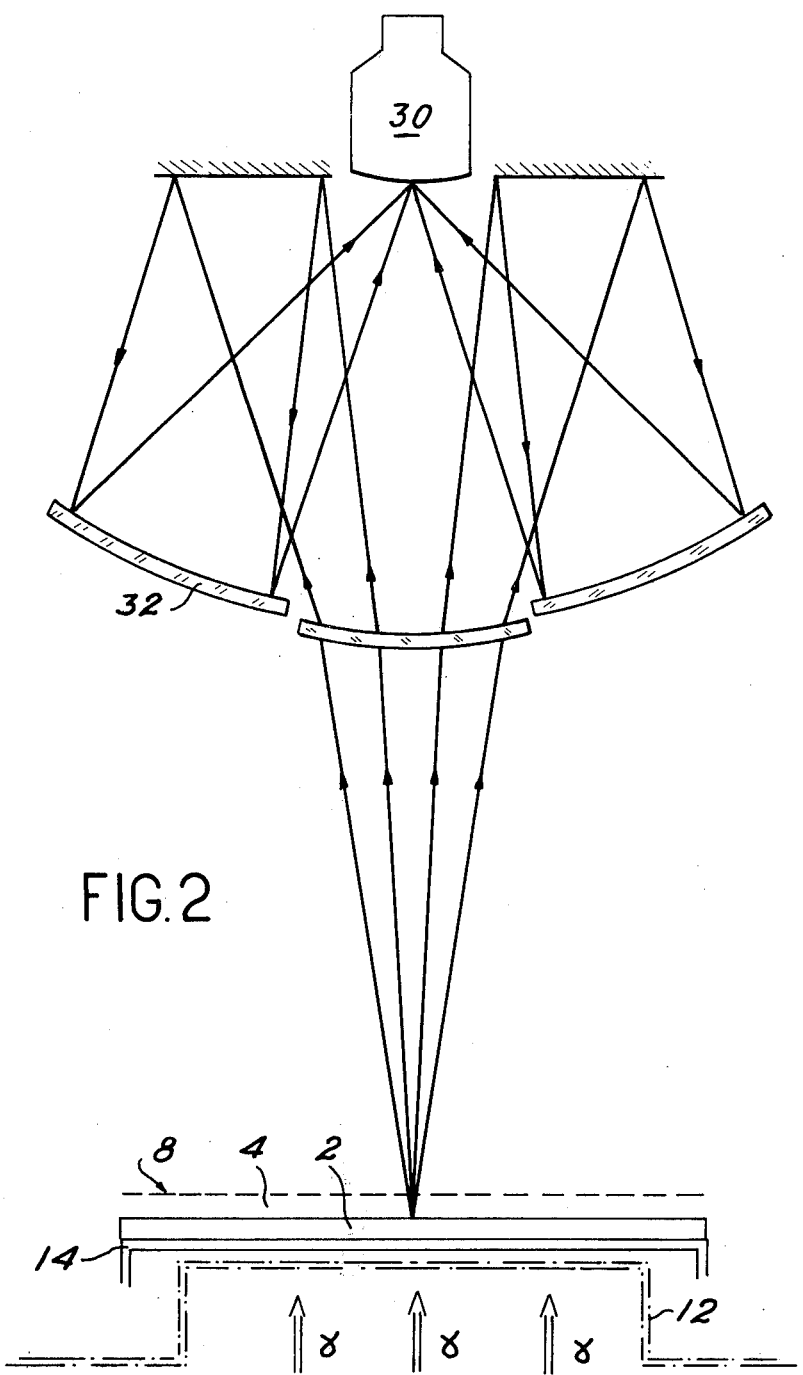
FIG. 2 another embodiment of the detector according to the invention.

FIG. 2 shows another embodiment of the detector according to the invention. A known mirror optical system 32 in box 31 reforms the image of xenon crystal 2 on camera tube 30. The brightness of the detector according to the invention is such that it is able to optically reform the image of a 32cm field, whilst still having a large number of photons per absorbed quantum in the xenon crystal on the photocathode of the camera receiver tube 30. For example, a catoptric lens of magnification 1/4 and aperture $f/0.65$ gives per quantum of 140 KeV (gamma of technetium $99^m$ conventionally used in nuclear medicine) 1,400 photons on the camera tube 30 with a diameter of 8cm.

The invention is not limited to the embodiments described and represented hereinbefore and various modifications can be made thereto without passing beyond the scope of the invention.

What is claimed is:

1. A gamma radiation detector, wherein it comprises a xenon crystal, a xenon atmosphere above said xenon crystal, a pair of electrodes comprising two metallic electrodes on either side of the xenon crystal, the first electrode being brought to negative potential (cathode) and located in the vicinity of one face of the xenon crystal and the second electrode brought to positive potential (anode) is placed parallel to the cathode in the xenon atmosphere and means for visualising photons emitted in the gaseous xenon atmosphere, whereby the face of the xenon crystal in the vicinity of the cathode is arranged in such a way that it receives the gamma radiation to be measured.

2. A gamma radiation detector according to claim 1, wherein the anode has a grid-like structure.

3. A detector according to claim 1, wherein it also comprises a visible ultra-violet converter between the anode and the visualising means.

4. A detector according to claim 1, wherein the potential difference between the pair of metallic electrodes and the distance between said two electrodes is such that the product of the first Townsend coefficient by the length of the path of an electron from the xenon crystal in the gaseous xenon is below 0.1.

5. A detector according to claim 3, wherein the said converter comprises a diphenyl stilbene layer or a salicylate layer.

* * * * *